March 30, 1954     G. N. BUMSTEAD     2,673,488
AUTOMATIC EXPOSURE CONTROL FOR COPYING CAMERAS
Filed April 25, 1951     3 Sheets-Sheet 1

INVENTOR:
George Newman Bumstead,
BY Pierce, Scheffler & Parker,
ATTORNEYS.

March 30, 1954 G. N. BUMSTEAD 2,673,488
AUTOMATIC EXPOSURE CONTROL FOR COPYING CAMERAS
Filed April 25, 1951 3 Sheets-Sheet 2
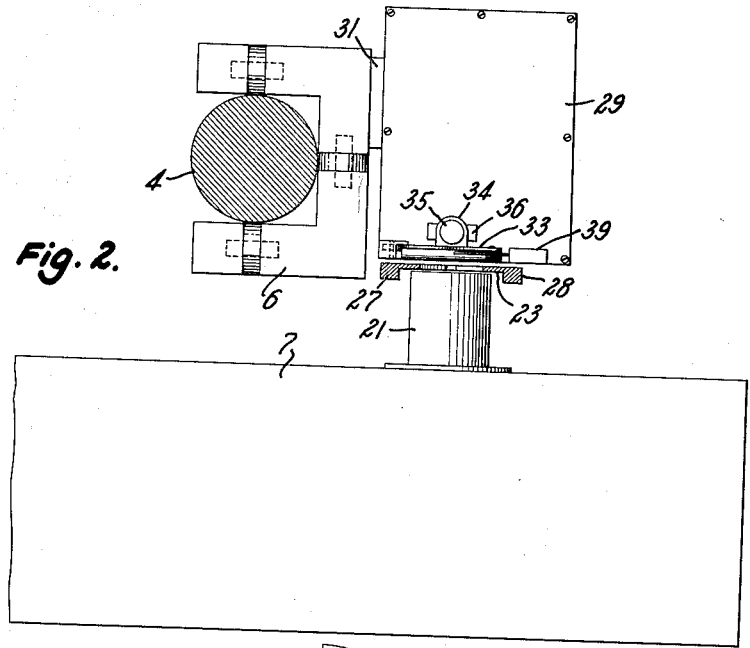
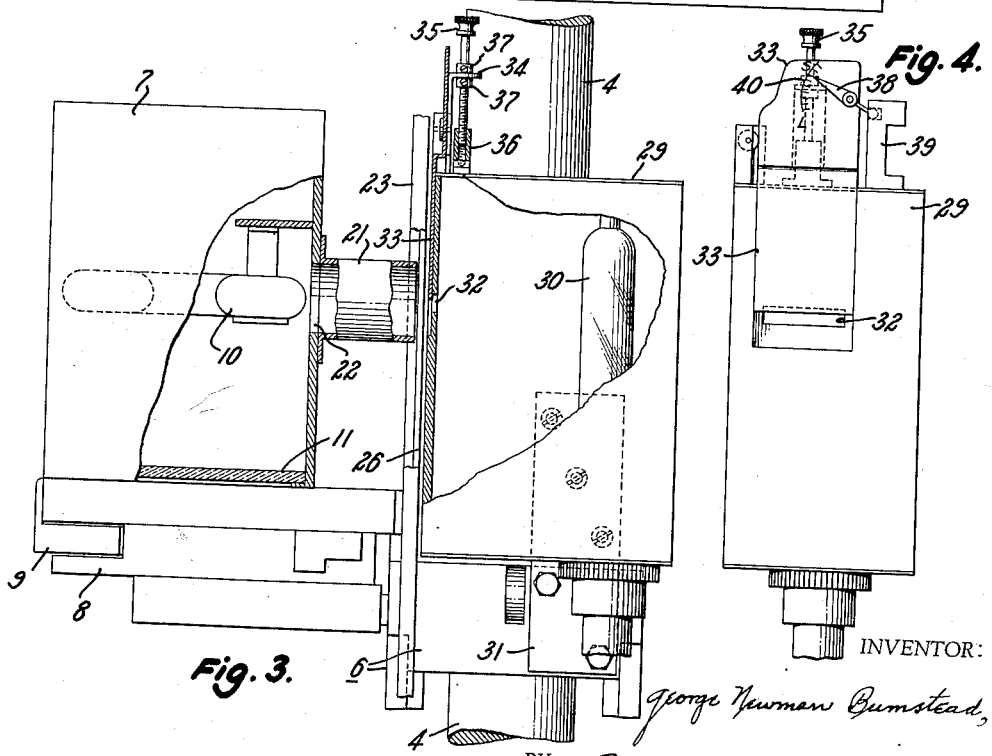

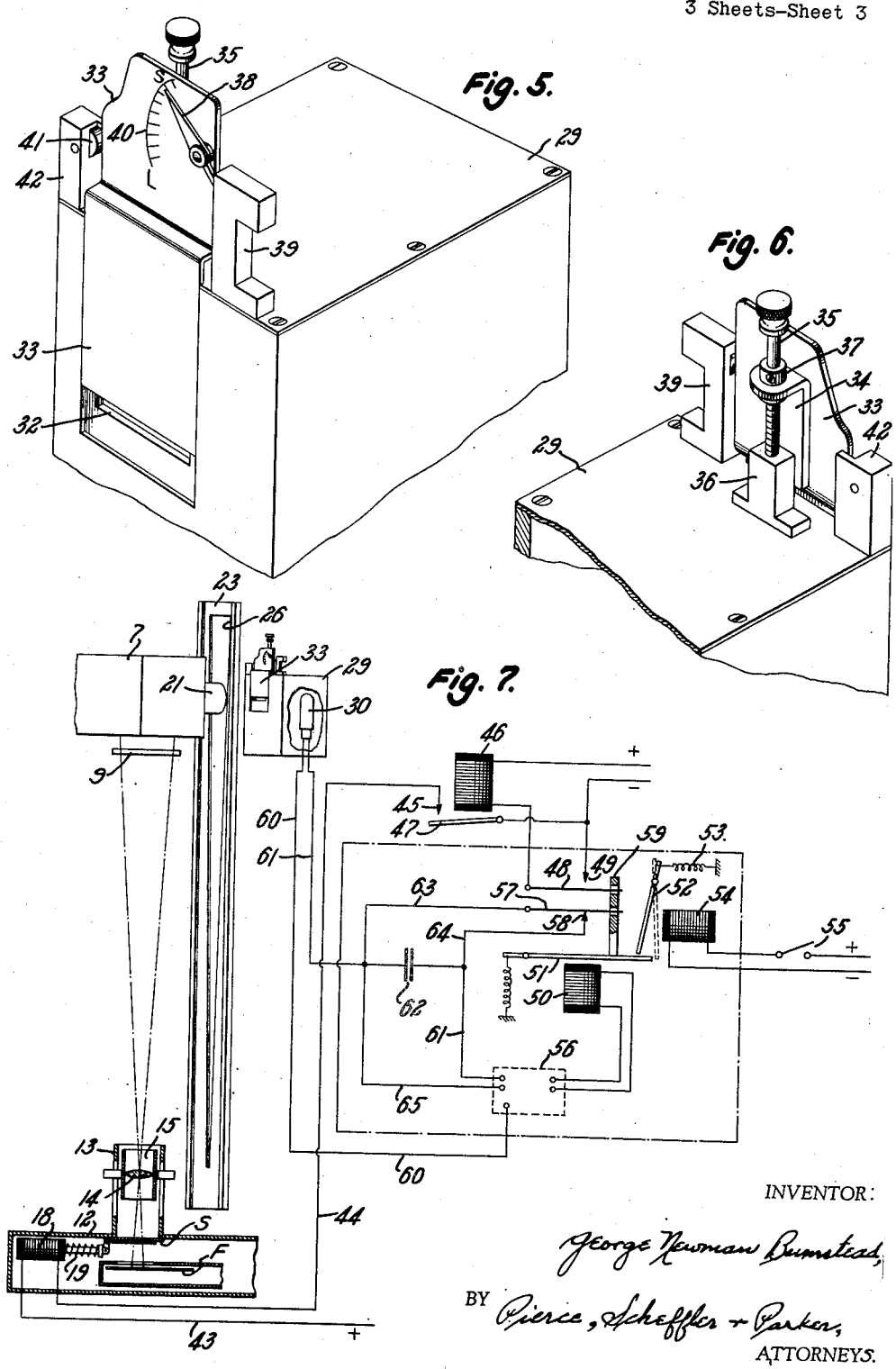

Patented Mar. 30, 1954

2,673,488

UNITED STATES PATENT OFFICE 2,673,488

AUTOMATIC EXPOSURE CONTROL FOR COPYING CAMERAS

George Newman Bumstead, Bethesda, Md., assignor to National Geographic Society, a corporation of the District of Columbia Application April 25, 1951, Serial No. 222,755

12 Claims. (Cl. 88—24)

This invention relates to automatic exposure control for copying cameras, and more particularly to automatic exposure control apparatus for copying cameras which are adjustable to regulate the ratio of the reproduced image size to the size of the object which is to be copied.

This application is a continuation-in-part of my copending application Serial No. 68,566, filed December 31, 1948, "Copying Camera."

Objects of the invention are to provide, in a copying camera adjustable to control the ratio of the reduced image size to the copied object size, automatic exposure control apparatus which compensates for the variation in effective lens aperture when the lens is focused for different ratios of reproduction. An object is to provide automatic exposure control apparatus energized in accordance with the illumination of the object to be copied, and operative to afford a uniform exposure for different degrees of reduced ratios of the image size to the object size. More specifically, an object is to provide in a copying camera, an object illumination-time integrating system for determining the exposure time in accordance with the reduction ratio of the image size to the object size. An object is to provide a copying camera in which an object support and a film support are mounted for relative movement to determine the size of the reproduced image, and a photoelectric exposure control system is carried by the movable support, the exposure control system being illuminated in accordance with the illumination of the object to be copied as modified or modulated by the size of the reproduced image.

These and other objects and the advantages of the invention will be apparent from the following specification when taken with the accompanying drawings, in which:

Fig. 2 is a fragmentary plan view, partly in section, of the phototube housing and the adjacent portion of the light box;

Fig. 3 is a fragmentary side elevation of the same, with parts in section;

Fig. 4 is a front elevation of the phototube housing as seen when removed from the camera;

Fig. 5 is a fragmentary perspective view of the top and front of the housing on a larger scale and showing the slide for adjusting the effective cross-section of the light opening of the housing;

Fig. 6 is a fragmentary perspective view of the slide adjusting mechanism; and

Fig. 7 is a schematic perspective view of the exposure control apparatus, and including a wiring diagram.

Figure 1:
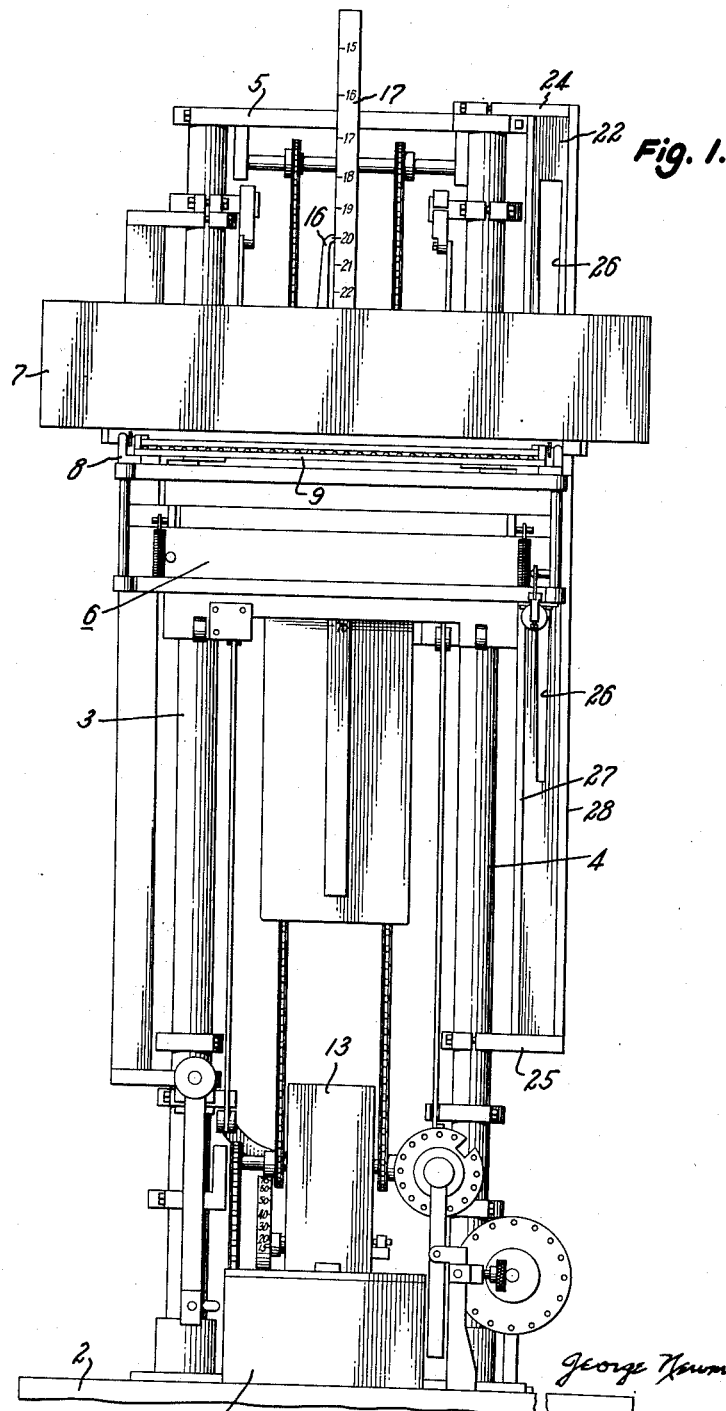
Fig. 1 is a front elevation of a copying camera, as described in detail in my copending application, which includes automatic exposure control apparatus embodying the present invention.

In Fig. 1 of the drawings, the reference numeral 2 identifies a rigid camera base supporting a rugged framework comprising two vertically extending standard or guide tracks 3, 4 preferably of circular transverse cross-section, and a cross bar 5 connecting the tops of the standards. A carriage, identified generally by numeral 6, is slidably mounted on the standards 3, 4 for vertical travel and carries a light box 7 and a saddle 8 on which a composing frame 9, as described and claimed in my prior Patent No. 2,495,887, January 31, 1950, may be positioned. A light source within the box 7 is preferably a luminous tube 10 comprising a plurality of parallel sections for uniform illumination of the transparency or stencil assembled on the composing frame 9 through the ground glass or milk glass plate 11 which forms the lower wall of the light box.

A light-tight chamber 12 on the base 2 has an opening in its upper wall which is rendered light-tight by a cylindrical sleeve or lens mount 13 which surrounds and extends upwardly from the opening. A lens assembly including an adjustable diaphragm and a multiple element lens, but shown schematically in Fig. 7 as a single lens 14 in a tube 15, is slidably supported within the sleeve 13 for vertical adjustment to focus an image of transparency or other object to be copied upon a film F within the chamber 12. The carriage 6 of the illustrated camera may be adjusted vertically to vary the size of the reproduced image from 15% to 70% of the size of the transparency on the composing frame 9, and the particular ratio of reproduction is indicated by the position of a pointer 16, fixed to the carriage 6, with respect to a graduated scale on a bar 17 secured to the stationary camera framework.

The camera as shown in Fig. 1 includes means for automatically focusing the image on the film F as the carriage is adjusted vertically to control the size of the reproduced image and for automatically adjusting a feed of the film F in accordance with the image size but these mechanisms and the motor means for carriage adjustment form no part of the present invention and, for a clear and concise disclosure of the invention, will not be described herein. Reference is made to my copending application Ser. No. 68,566 for a detailed description of the complete camera.

The invention may be applied to any copying camera in which an object illuminated by transmitted or reflected light may be reproduced in desired size by focusing the lens system within the range of less than a focus at infinity. The shutter S for determining the exposure may be of sector type or, as shown schematically in Fig. 7, of focal plane type, and opened by a solenoid 18 acting when energized in opposition to the force of a reclosing spring 19.

The control of the exposure is not based upon the light intensity at the film but upon the intensity of the light source which illuminates the object to be copied and which is at a fixed distance from the object. It is not practical to regulate the luminescent tube light source to maintain a constant intensity, and uniform exposures would not be had by preselecting a particular exposure time for all image sizes if the light source intensity could be maintained constant. Although the image brightness bears a definite ratio to the light source brightness, and thereby to the object brightness, at any given adjustment of the carriage 6 and lens 14 for a particular image size, that ratio varies with the image size since the effective diaphragm aperture or f-value of the lens varies with the focusing of the camera to alter the dimensions of the reproduced image. This follows from the fact that the diaphragm openings or f-values (as marked on the barrel of a lens) are accurate only when the lens is focused on infinity. When focused upon a relatively near object, the effective lens aperture is $$\frac{V-f}{F}$$

where V is the lens-to-film distance, F is the focal length of the lens, and $f$ is the marked lens aperture. In the case of a camera with a lens having a focal length of six inches, this variation of the effective aperture of any selected diaphragm opening (as marked on the lens barrel) necessitates a variation of the exposure time, at constant illumination of the material to be copied, of the order of two-to-one when the copying system may be adjusted to vary the linear dimensions of the image between 70% and 15% of the corresponding dimensions of the material to be copied.

In addition to this variation of the exposure time with the degree of reduction in the linear dimensions of the material to be copied, the exposure time varies with the intensity of the illumination of the material to be copied, and this intensity varies for a number of reasons, i. e. (1) uncontrollable fluctuations of the power line voltage, (2) reduction in the efficiency of the light source due to aging, and (3) the drop in efficiency of a luminescent tube light source as it heats up when placed in operation; the light intensity being a maximum when the tube is turned on, and dropping approximately 20% after twenty minutes of use.

The photoelectric exposure control apparatus of the invention affords a constant foot-candle-seconds exposure of the film in spite of these variables by integrating against time a beam of light derived from the light source and modulated in accordance with variations in the ratio of the light intensities at the object to be photographed and at the photosensitive film.

A flanged tube 21 is secured over an opening 22 in the rear wall of the light box 7, and its rearward end is closely adjacent but preferably not in sliding contact with a vertically extending plate or strip 23 which is rigidly mounted on the standard 4 by top and bottom brackets 24 and 25. The axis of the tube 21 is alined with the light tube 10 in the light box 7, and the light beam through the tube 21 therefore varies in intensity with the light source and with the illumination of the stencil carried by the composing frame 9. The plate or strip 23 is provided with a downwardly tapering slot 26 for passing a portion of the light beam of tube 21 which varies with the vertical adjustment of the carriage 6 to determine the reproduced image size. Ribs 27, 28 are integral with or secured to the front face of the plate or strip 23 to form a channel into which the rear end of the tube 21 extends, thereby to prevent extraneous light from entering the beam which is transmitted through the tube 21 and the effectively operative portion of the light cam slot 26 which is horizontally alined with the tube 21.

A housing 29 for a phototube 30 is rigidly mounted on the movable carriage by a strap 31, the housing being light-tight except for an opening 32 in its front wall which is closely adjacent the rear face of the light cam plate or strip 23. The opening 32 is of relatively shallow rectangular form with its center on the axis of the beam-directing tube 21. A slide 33 is vertically adjustable on the forward wall of the housing 29 to control the effective size of the aperture 32 in accordance with the sensitivity or "film speed" of the photographic film employed in the camera. A bracket 34 is secured to the rear face of the slide 33, and an adjusting screw 35 which is threaded into a block 36 on the top wall of the housing 29 extends through the bracket 34 and has washers 37 secured thereto at opposite sides of the bracket. Rotation of the screw 35 adjusts the slide 33 vertically, and the particular adjustment at a given time may be indicated by a pointer 38 pivoted on the slide 33, one end of the pointer being seated in a socket of a bracket 39 mounted on the top wall of the housing 29 and the other end being movable along a graduated scale 40 on the upper end of the slide 33. A guide roller 41 for insuring linear adjustments of the slide 33 by the screw 35 may be mounted on a bracket 42 on the top wall of the photocell housing 29. Letters "S" and "L" are applied to the end marks of the graduated scale, as shown, to indicate adjustments of the slide 33 for the shortest and longest exposures respectively. The lower edge of the slide 33 is just clear of the opening 32 of the housing 29 when the pointer 38 is at the "S" mark of the scale, and it masks the opening 32 to a progressively increasing extent on adjustment of the screw 35 to shift the pointer 38 towards the lower end of the scale.

The intensity of the beam of light incident upon the phototube 30 thus varies with the illumination of the transparency of the composing frame, since the phototube and the composing frame are each at fixed distances from the light tube 10, and light energy reaching the phototube 30 at any given brightness of the lamp tube 10 depends upon the effective cross-section of the beam of light at the phototube. The vertical dimension of the light beam is determined by the adjustment of the slide 33 in accordance with the "film speed" of the photographic film, and the width of the light beam is controlled by the cam slot 26 of the plate or strip 23. The light energy at the phototube 30 thus varies with the light energy at the film, and it may be integrated against time to afford a constant foot-candle-seconds exposure of the film in spite of fluctuations of the lamp tube brightness and the variations in effective lens aperture which are incident to changes in the ratio of image size to object size.

An electrical network for automatically controlling the exposure time is shown schematically in Fig. 7. For simplicity of illustration and explanation, only those elements of the network which control the camera shutter are shown, and reference is made to my copending application for an illustration and description of the complete electrical network of the Fig. 1 camera; the complete network including means for advancing the film between successive exposures.

As above described, the shutter S is opened by a solenoid 18 and closed by a spring 19 on deenergization of the solenoid. A source of direct current, not shown but preferably a transformer-rectifier system such as employed in radio receivers, supplies a low voltage direct current to the terminals of control circuits which are identified by the symbols "+," and "—," respectively. The circuit for energizing the shutter-opening solenoid 18 includes a connection 43 to the positive terminal of the direct current source, and a lead 44 to the front contact 45 of a relay 46 having an armature or movable contact 47 connected to the negative terminal of the direct current source. The relay 46 is connected across the direct current source through the blade 48 and back contact 49 of a relay 50 having an armature 51 which is normally trapped in pulled-in position by the armature 52, in back position as established by a spring 53, of a relay 54 which is connected across the direct current source through a normally open and manually operable switch 55. Closure of switch 55 energizes the relay 54 to attract its armature 52 to release the armature 51 and thus permit its blade 48 to engage the back contact 49 to energize the relay 46 to complete an energizing circuit for the shutter-opening solenoid 18.

The relay 50 is in the output circuit of an electronic integrating system, indicated schematically by the block 56, which is energized by the phototube 30, and the relay 50 has a second switch blade 57 for engagement with a front contact 58; the blades 48 and 57 being insulated from each other by extending through slots in an insulating material block or strip 59 mounted on the armature 51. The phototube 30 is connected across the integrating apparatus 56 by a lead 60 and a lead 61 which includes, in series, a condenser 62. The blade 58 and front contact 57 of the relay 50 are connected across the condenser 62 by leads 63, 64 respectively. A lead 65 extends from the phototube side of the condenser 64 to the integrating unit 56 to impose thereon a voltage built up across the capacitor 64 by the time integration of the light-controlled output of the phototube 30. At a preselected voltage input to the electronic unit 56, a Thyratron tube fires to energize relay 50 to attract its armature 51, thereby opening the contacts 48, 49 to deenergize relay 46 to open the circuit of the shutter-opening solenoid 18 thereby permitting closure of the shutter S by the spring 19.

The armature 51 of relay 50 is then trapped in pulled-in position by the armature 52 of the relay 54 and the condenser 62 is short-circuited by the contacts 57, 58 of the relay 50 to reduce to zero the input voltage to the electronic control unit 62. The voltage charge of the condenser 62 is thus dissipated after each exposure of the film F, and the apparatus is reset for another light-time integration to control the shutter closing upon the next actuation of the switch 55 to open the shutter.

The appropriate adjustment of the film speed slide 33 for films of different type or for different lots of film of the same type and therefore of at least approximately the same emulsion speed, may be quickly determined empirically by making a series of exposures on a film at different settings of the slide 33, developing the film under selected standard conditions as to time and temperature, and selecting the slide setting which resulted in a negative of optimum characteristics.

It is to be understood that the invention is not limited to the particular apparatus as herein shown and described since various types of light-time integrating systems of phototube or current-generating photocell type may be employed to terminate the exposure by a time integration of a beam of light derived from the light source and modulated according to the film speed and the ratio of image size to object size. While the photosensitive material upon which the image is to be projected has been described as a "film," it is to be understood that the term "film" is used in a broad sense in the following claims and is intended to include photosensitive layers on paper, glass plates and the like as well as photosensitive layers on films.

I claim:

1. In a photographic reproduction apparatus including a film support, an object support, means mounting one of said supports for movement towards and away from the other support to control the ratio of the reproduced image size to the object size, a lens between said supports and movable to focus an image of said object upon a film on said film support; the combination of a shutter biased to closed position, a solenoid for opening said shutter when energized, an electrical network including a manually operable switch for energizing said shutter-opening solenoid, and integrating means for deenergizing said solenoid on a predetermined exposure of the film; said integrating means including a photoelectric element, light means for imposing upon said photoelectric element a beam of light of an intensity proportional to the illumination by said light source of the object to be reproduced, and means actuated by movement of the movable support for modulating the beam of light imposed upon said photoelectric element in accordance with the ratio of image size to object size.

2. In a photographic reproduction apparatus, the invention as recited in claim 1, wherein said movable support is the object support.

3. In a photographic reproduction apparatus, the invention as recited in claim 1, in combination with a light source at a fixed distance from said object support for illuminating an object on said object support, and wherein said light means includes means for imposing upon said photoelectric element a beam of light derived directly from said light source.

4. In a photographic reproduction apparatus, the invention as recited in claim 1, wherein said modulating means includes a stationary plate having a tapered slot therethrough and arranged in the path of the beam of light to said photoelectric element, said photoelectric element being connected to and movable with said movable support.

5. In a photographic reproduction apparatus, the invention as recited in claim 4, in combination with means adjustable to regulate the cross-section of the beam of light imposed upon said photoelectric element in accordance with the film speed of the film to be exposed.

6. A light integrating system for use with a camera including means adjustable to vary the ratio of the light intensity at the object to be photographed to the light intensity at the photosensitive film; said light integrating system including a photoelectric element having an effective electrical output varying with the illumination thereof, means for transmitting towards said photoelectric element a beam of light which varies in intensity with the illumination by said light source of the object to be photographed, means for adjusting the cross-section of the beam of light transmitted towards the photoelectric element in accordance with the speed of the photosensitive film, means controlled by said adjustable camera means to modulate the beam of light in accordance with variations in the ratio of the light intensities at the object to be photographed and at the photosensitive film, and light integrating means energized by said photoelectric element.

7. In photographic apparatus of the type including as a unitary assembly the photoelectric element of a light-integrating system and a light source for illuminating an object, a lens for forming an image of said object upon a photosensitive sheet or film, and means supporting said assembly and lens for relative movement with respect to each other and the photosensitive sheet or film to vary the size of the image on the photosensitive sheet or film, whereby the light intensity at the photosensitive sheet or film decreases with an increase in the image size; means for transmitting to the photoelectric element of the light-integrating system a beam of light from and proportional to the intensity of said light source, means for modulating the beam of light in accordance with changes in light intensity at the photosensitive sheet or film due to changes in the selected image size, and a light integrating circuit energized by said photoelectric element; said modulating means comprising an opaque strip with a slot therethrough of varying width, said slotted strip being located in the path of the beam of light from said source to said photoelectric element, whereby the cross-section of the beam of light incident upon said photoelectric element varies with the relative adjustment of said assembly with respect to said sheet or film to obtain the desired image size upon said photosensitive sheet or film.

8. In photographic apparatus, the invention as recited in claim 7, wherein said light integrating system includes a housing for said photoelectric element and having an opening through which said modulated beam of light is admitted to said photoelectric element, in combination with means for adjusting the size of said opening in the housing in accordance with an exposure-controlling factor other than illumination intensity.

9. In photographic apparatus, the invention as recited in claim 7, in combination with an electrical circuit including means operable upon a closure of the circuit to initiate the exposure of the photosensitive sheet or film, and means operable by said light integrating circuit to terminate the exposure when the integrated illumination of the photosensitive sheet or film reaches a preselected foot-candle-seconds value.

10. The combination with photographic apparatus including a frame, a light source within a housing, means for supporting a transparency in juxtaposition to said housing and to be illuminated by said light source, a support for a photosensitive sheet or film, a lens for forming an image of the transparency on a photosensitive sheet of film on said support, means supporting said housing for adjustment on said frame, and means for adjusting said housing on said frame and for adjusting said lens with respect to said support to vary the size of the image formed on a photosensitive sheet or film on said support, of a light integrating system including a photoelectric element, a casing in which said photoelectric element is mounted, said casing being secured to and movable with said housing, said casing and housing having aligned openings for transmitting a beam of light from the light source to said photoelectric element, an opaque strip fixed to said frame in the path of the beam of light and having a cam slot of varying width therethrough to modulate the beam of light in accordance with variations in the light intensity at said support due to adjustments of said light source housing on said frame, and a light integrating circuit energized by said photoelectric element.

11. The invention as recited in claim 10, in combination with an electrical circuit including means operative upon a closure of the circuit to initiate an exposure, and means operable by said light integrating circuit to terminate the exposure when the integrated light intensity at said support reaches a preselected foot-candle-seconds value.

12. In photographic apparatus, the combination with a supporting frame, a carriage for supporting a transparency to be reproduced, a light source on said carriage, a camera including a lens and a support for a photosensitive film, means mounting said carriage for adjustment on said supporting frame, said lens being movable to maintain a focus of an image of the transparency upon the photosensitive film as said carriage is adjusted on said supporting frame to determine the image size of said transparency on the photosensitive film, a photoelectric element having an electrical output varying with the illumination thereof, means supporting said photoelectric element on said carriage for movement therewith, means for transmitting a light beam from said light source to said photoelectric element, and an opaque strip secured to said supporting frame in the path of said light beam and having an opening of varying width therethrough to compensate for variations in illumination of the photosensitive film due to adjustment of said carriage to obtain the desired image size on said photosensitive film.

GEORGE NEWMAN BUMSTEAD.

References Cited in the file of this patent

UNITED STATES PATENTS

| Number | Name | Date |
|---|---|---|
| 2,258,994 | Merriman | Oct. 14, 1941 |
| 2,448,736 | Rabinowitz | Sept. 7, 1948 |
| 2,463,985 | Linde | Mar. 8, 1949 |